United States Patent
An et al.

(10) Patent No.: US 7,483,973 B2
(45) Date of Patent: Jan. 27, 2009

(54) GATEWAY FOR SERVICE ORIENTED STATE

(75) Inventors: Lianjun An, Yorktown Heights, NY (US); JaiPaul K. Antony, Yonkers, NY (US); Edward B. Boden, Vestal, NY (US); Joshy Joseph, Poughkeepsie, NY (US); Thomas R. Maguire, Brewster, NY (US); Michael D. Williams, Newark Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 1261 days.

(21) Appl. No.: 10/652,794

(22) Filed: Aug. 28, 2003

(65) Prior Publication Data

US 2005/0066058 A1    Mar. 24, 2005

(51) Int. Cl.
G06F 15/173    (2006.01)

(52) U.S. Cl. .......................... 709/224; 713/1

(58) Field of Classification Search ......... 709/223–226; 725/80
See application file for complete search history.

(56) References Cited

U.S. PATENT DOCUMENTS

| | | | |
|---|---|---|---|
| 5,715,453 A | 2/1998 | Stewart | 395/615 |
| 6,088,702 A * | 7/2000 | Plantz et al. | 707/103 R |
| 6,105,043 A | 8/2000 | Francisco et al. | 707/513 |
| 6,173,284 B1 | 1/2001 | Brown | 707/10 |
| 6,208,975 B1 | 3/2001 | Bull et al. | 705/14 |
| 6,256,773 B1 * | 7/2001 | Bowman-Amuah | 717/121 |
| 6,289,382 B1 * | 9/2001 | Bowman-Amuah | 709/226 |
| 6,308,178 B1 * | 10/2001 | Chang et al. | 707/100 |
| 6,360,246 B1 | 3/2002 | Begley et al. | 709/203 |
| 6,421,737 B1 | 7/2002 | Stone et al. | 709/318 |
| 6,442,748 B1 * | 8/2002 | Bowman-Amuah | 717/108 |
| 7,058,931 B2 * | 6/2006 | Pai | 717/137 |
| 7,096,266 B2 * | 8/2006 | Lewin et al. | 709/226 |
| 2001/0010061 A1 | 7/2001 | Matsumoto | 709/249 |
| 2001/0016880 A1 | 8/2001 | Cai et al. | 709/321 |
| 2001/0039570 A1 | 11/2001 | Stewart et al. | 709/205 |
| 2001/0056497 A1 | 12/2001 | Cai et al. | 709/230 |
| 2002/0010798 A1 | 1/2002 | Ben-Shaul et al. | 709/247 |
| 2002/0013759 A1 | 1/2002 | Stewart et al. | 705/37 |
| 2002/0055958 A1 | 5/2002 | Edwards et al. | 707/514 |
| 2002/0059134 A1 | 5/2002 | Ebbs et al. | 705/37 |
| 2002/0073236 A1 | 6/2002 | Helgeson et al. | 709/246 |

(Continued)

OTHER PUBLICATIONS

Oracle Corporation, Oracle9i Application Server Wireless Edition Implementation Guide Release 1.1, 2001, Introduction, p. 1-13.
G. Flurry et al., The IBM Application Framework for e-buisness, 2001, p. 1-26.

*Primary Examiner*—Bunjob Jaroenchonwanit
*Assistant Examiner*—Tauqir Hussain
(74) *Attorney, Agent, or Firm*—Cantor Colburn LLP; William Kinnaman

(57) ABSTRACT

A method and system for managing state data of a service in a service-oriented architecture by establishing a gateway for service-oriented state comprising: configuring an extensible, pluggable interface to support for extensible processor interfaces; data query support on service state data, automated notification capability on service state to a client; and automated data transform on service state data to a client format; defining an interface framework for interaction between a service and the gateway. The method also includes establishing an extensible meta-data definition comprising an extensible set of service state data attributes including state data qualifiers, constraints, and access mechanisms; and utilizing one or more pluggable processors configured to utilize the extensible meta-data definition for interfaces and decision making based on the meta-data.

15 Claims, 5 Drawing Sheets

U.S. PATENT DOCUMENTS

| | | |
|---|---|---|
| 2002/0103934 A1 | 8/2002 | Fishman et al. ............. 709/246 |
| 2002/0103935 A1 | 8/2002 | Fishman et al. ............. 709/246 |
| 2002/0133568 A1 | 9/2002 | Smith et al. ................. 709/219 |
| 2002/0144015 A1 | 10/2002 | Lortz ......................... 709/318 |
| 2002/0152318 A1* | 10/2002 | Menon et al. ............... 709/231 |
| 2003/0046366 A1* | 3/2003 | Pardikar et al. ............. 709/219 |
| 2003/0074367 A1* | 4/2003 | Kaler et al. ................. 707/102 |
| 2003/0126136 A1* | 7/2003 | Omoigui ..................... 707/10 |
| 2004/0068529 A1* | 4/2004 | Pai ............................. 708/206 |
| 2004/0093515 A1* | 5/2004 | Reeves, Jr. ................. 713/201 |
| 2004/0135805 A1* | 7/2004 | Gottsacker et al. .......... 345/751 |
| 2004/0136698 A1* | 7/2004 | Mock ......................... 386/123 |
| 2004/0148370 A1* | 7/2004 | Sadiq ......................... 709/223 |
| 2004/0267718 A1* | 12/2004 | Milligan et al. ................ 707/3 |
| 2004/0267719 A1* | 12/2004 | Doherty et al. ................. 707/3 |
| 2005/0010930 A1* | 1/2005 | Vaught ....................... 719/318 |
| 2005/0021502 A1* | 1/2005 | Chen et al. ..................... 707/2 |
| 2005/0044197 A1* | 2/2005 | Lai ............................. 709/223 |
| 2005/0278390 A1* | 12/2005 | Kaler et al. ................. 707/200 |
| 2006/0253495 A1* | 11/2006 | Png ............................ 707/200 |
| 2007/0038610 A1* | 2/2007 | Omoigui ........................ 707/3 |

* cited by examiner

GATEWAY FOR SERVICE ORIENTED STATE

BACKGROUND

Today there is no built in support in a service-oriented architecture (like web services) to inform a client of its state changes. This is an important feature for a service-oriented architecture as most computing systems are asynchronous in nature and the client needs to acquire such a change of the state through some asynchronous mechanisms.

In a service oriented component model (java services and/or web services), the state of a component is held by the service through its instance variables and/or session state variables and/or persistence storage media and/or using external resources. The service exposes its state information through various custom application programming interfaces (APIs). This interface model is not flexible and extensible, therefore each client has to program code to fit-in specific APIs and to understand the semantics as defined through the APIs. The clients are not flexible enough to query state data based on its exposed information model (data schema). The granularity and flexibility of these APIs vary with different implementation.

Therefore, what is needed is a framework to define mechanisms that enable a service to extend its state with change notification semantics a flexible service state exposure model through various queries on the state of the service using the exposed state information model (schema).

SUMMARY OF THE INVENTION

These and other improvements are set forth in the following detailed description. For a better understanding of the invention with advantages and features, refer to the description and to the drawings.

Disclosed herein in an exemplary embodiment is a method for managing state data of a service in a service-oriented architecture by establishing a gateway for service-oriented state comprising: configuring an extensible, pluggable interface to support for extensible processor interfaces; data query support on service state data, automated notification capability on service state to a client; and automated data transform on service state data to a client format; defining an interface framework for interaction between a service and the gateway. The method also includes establishing an extensible meta-data definition comprising an extensible set of service state data attributes including state data qualifiers, constraints, and access mechanisms; and utilizing one or more pluggable processors configured to utilize the extensible meta-data definition for interfaces and decision making based on the meta-data.

Also disclosed herein in another exemplary embodiment is a system for managing state data of a service in a service-oriented architecture by establishing a gateway for service-oriented state comprising: a means for configuring an extensible, pluggable interface to support for extensible processor interfaces; data query support on service state data, automated notification capability on service state to a client; and automated data transform on service state data to a client format; defining an interface framework for interaction between a service and the gateway. The system also includes a means for establishing an extensible meta-data definition comprising an extensible set of service state data attributes including state data qualifiers, constraints, and access mechanisms; and a means for utilizing one or more pluggable processors configured to utilize the extensible meta-data definition for interfaces and decision making based on the meta-data.

Disclosed in yet another exemplary embodiment is a storage medium encoded with a machine-readable computer program code, the code including instructions for causing a computer to implement a method for managing state data of a service in a service-oriented architecture by establishing a gateway for service-oriented state, the method comprising: configuring an extensible, pluggable interface to support for extensible processor interfaces; data query support on service state data, automated notification capability on service state to a client; and automated data transform on service state data to a client format; defining an interface framework for interaction between a service and the gateway. The storage medium also includes code for implementing the method including: establishing an extensible meta-data definition comprising an extensible set of service state data attributes including state data qualifiers, constraints, and access mechanisms; and utilizing one or more pluggable processors configured to utilize the extensible meta-data definition for interfaces and decision making based on the meta-data.

BRIEF DESCRIPTION OF THE DRAWINGS

The present invention will now be described, by way of an example, with references to the accompanying drawings, wherein like elements are numbered alike in the several figures in which.

Figure 1A:
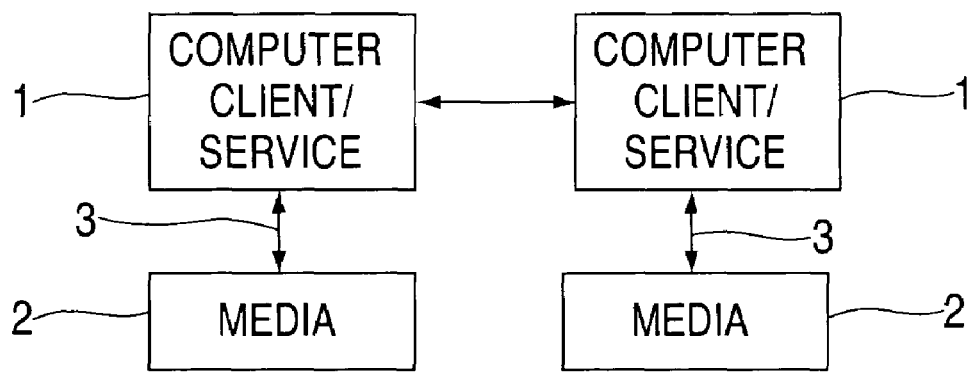
FIG. 1A depicts a simplified block diagram depicting and exemplary computer implementation.

Our detailed description explains the preferred embodiments of our invention, together with advantages and features, by way of example with reference to the drawings.

DETAILED DESCRIPTION OF THE INVENTION

Referring to FIGS. 1A-C and 2, disclosed herein in an exemplary embodiment, is a method and apparatus for managing the state data of a service in a service-oriented architecture. More particularly, a framework 10a to define mechanisms that enable a service 20 to extend its state with change notification semantics. In an exemplary embodiment, a service 20 may reside in a computer 1 configured to communicate with various system elements aand media 2 including another computer with a client 30. Moreover, the client could reside in the same computer 1 as the service 20.

The framework 10a enables a service 20 component with various extensible data query support on service state data 22, automatic notifying capability on service state data 22 change and data transform flexibility on service state data 22. This framework 10a is flexible as clients 30 can write any query expressions on the service state data 22; for example, a high level view of the state data 22, or it may be a granular (fine-grain) view on the state data 22. Advantageously, this framework 10a is extensible as new type of service state can be plugged in to the service oriented architecture. In an exemplary embodiment, these features are achieved through pluggable processors 108, 110, 112 utilizing the extensible meta-data framework 10a related to state data qualifiers, constraints and access mechanism.

It will be appreciated that as used herein, architecture is intended to mean both the process and the specifying of the overall structure, logical components, and the logical interrelationships of a computer, its operating system, a network, or other conception. An architecture can be a reference model, such as the Open Systems Interconnection (OSI) reference model, intended as a model for specific product architectures or it can be a specific product architecture, such as that for a particular processor or operating system.

Computer architecture can be divided into five fundamental components: input/output, storage, communication, control, and processing. In practice, each of these components (sometimes called subsystems) is sometimes said to have an architecture, so, as usual, context contributes to usage and meaning.

By comparison, the term design connotes thinking that has less scope than architecture. An architecture is a design, but most designs are not architectures. A single component or a new function has a design that has to fit within the overall architecture.

A similar term, framework, may be thought of as the structural part of an architecture but as used herein may also include processes. A framework may include both the process and the specifying of the overall structure, logical components, and the logical interrelationships of a system, processor and the like.

A tool set may be thought of as a collection of tools or functions to create artifacts (e.g., effects, code, schema, data, and the like) from a set of iputs with the assistance of a user intervention.

A component is a physical or non-physical abstraction element that provides/facilitates a selected set of functionalities/capabilities of the architecture and/or framework.

Another beneficial feature of this framework 10a is the support of data transformation for the client 30. There are different types of clients, based on the heterogeneous nature of the transport, presentation media, QoS and formatting requirements. These clients 30 access the service 20 for its state data 22 and expect the results formulated/configured in a manner appropriate for their consumption. In an exemplary embodiment, a framework 10a for transformation of the service state data 22 for the client(s) 20 based on their requirements is provided. These requirements may include transformation of the service state data 22 to a format that they can understand and utilize; for example, a stock quote service state data from a stock quote service may be converted into Wireless Markup Language (WML) format for a mobile device display or into Voice Extensible Markup Lanuguage (XML) format for a voice enabled device.

It is noteworthy to appreciate that a service-oriented architecture and the framework 10a of an exemplary embodiment disclosed herein facilitate and provide the following:

1. Enable a query on a current state of the service 20, preferably using a client specified query language;

2. Enable the service 20 to send service state data 22 changes to selected interested clients.

3. Transform a result of such queries and notification information to a client specified format.

An exemplary embodiment addresses the above requirements for a service-oriented architecture with a set of meta-data information and pluggable/adaptable interfaces and tooling. Advantageously the meta-data framework 10a is extensible to support state data qualifiers (security, transaction enable/disable, transaction scope and the like), constraints (availability, time constraints, time to live, mutability, cardinality, etc) and access mechanisms (push, pull and custom access mechanisms).

Figure 1B:
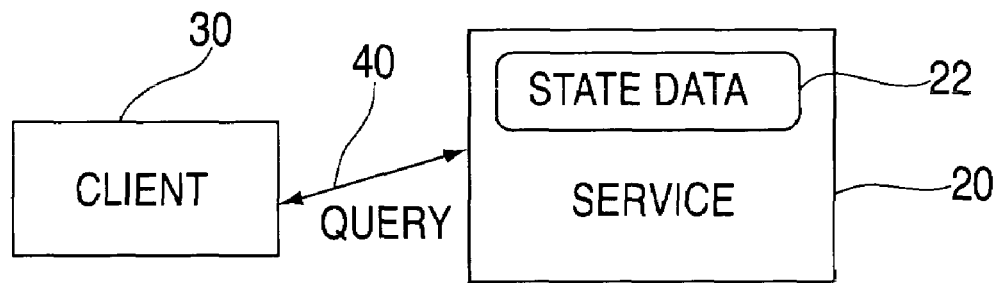
FIG. 1B depicts a simplified block diagram depicting client service interaction for a query.
Figure 1C:
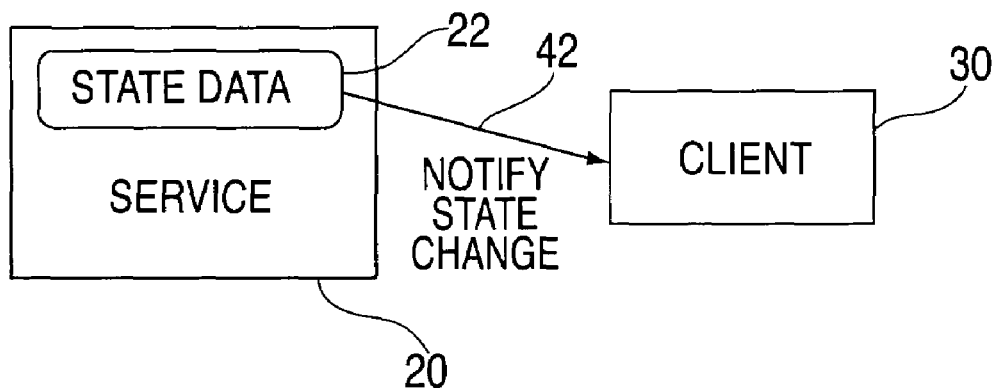
FIG. 1C depicts a simplified block diagram depicting client service interaction for notification of a state change.

Referring now to FIG. 1B and FIG. 1C, an illustration of the components involved in the framework 10a of an exemplary embodiment are depicted. An exemplary illustration of a process and communication between a service 20 and a client 30 are depicted. A service 20 e.g., Java Service/Web service, State Address Provider service, and the like, has some state information/data 22 such as an address, and would like to enable its clients 30 to query 40 this state using some query language including, but not limited to, XQuery, ISQL, XSL EJBQL and the like. For example the client 20 may query the zip code from the address. Moreover, as depicted in FIG. 1C, a service 20, e.g., Java service, web service, State Address Provider service, has some state information, in this instance an Address and would like to send notifications 42 of a state change, e.g., address change, to the various clients 30 that are/may be interested in listening to the state data changes.

Gateway for a Service Oriented State

Figure 2:
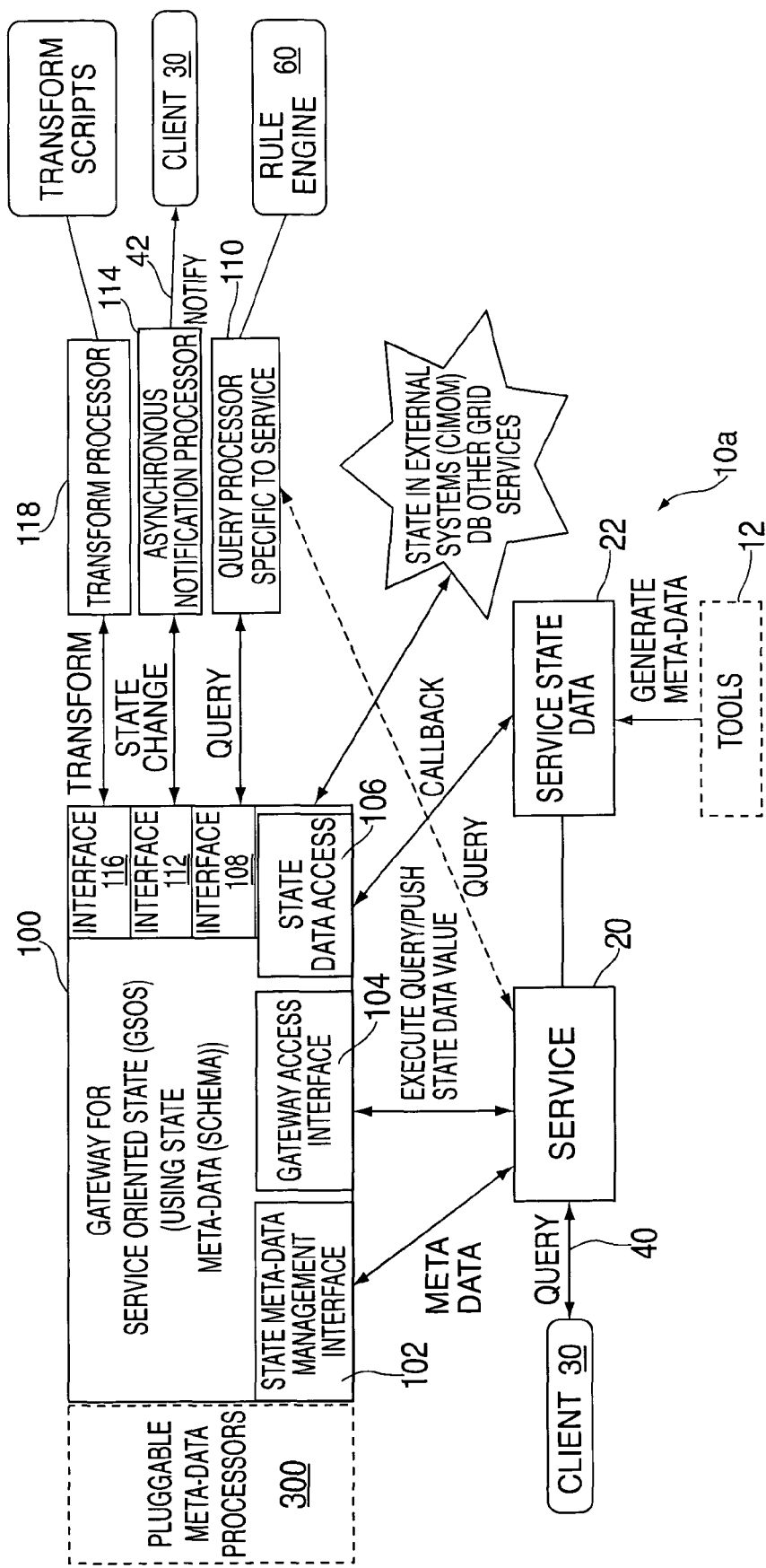
FIG. 2 illustrates a simplified block diagram of an information communication framework including a gateway for service oriented state in accordance with an exemplary embodiment.

Turning now to FIG. 2, a simplified block diagram of the framework 10a of an exemplary embodiment is depicted. In an exemplary embodiment the framework 10a includes and describes a Gateway for a Service Oriented State (GSOS) 100 and its features. A GSOS 100 is responsible for managing the service state data 22 in a service-oriented architecture. Service state data 22 may be a logical, or physical abstraction, state and/or state data 22 in logical sense could be just a pointer, or a physical construct, such as a real address. This service state data 22 abstraction and meta-data information may be created using the tools optionally provided along with this framework 10a in another exemplary embodiment. This framework 10a employing the GSOS of an exemplary embodiment includes, but is not limited to, these components and functionalities:

1. A meta-data definition;

2. An extensible meta-data processor;

3. An interfaces framework to define the interactions between a service 20 and the GSOS 100.

4. A pluggable interface to support service state data Query, notification and transformation Meta-Data Definition The meta-data definition of an exemplary embodiment is an extensible set of state data constraints, qualifiers and data access mechanisms. The meta-data definition is an information model associated with the state data 22 and provides more semantic information on the service's 20 state. This meta-data definition may be an extension to the state data 22 schema through annotations on the schema or can be a more general-purpose language such as Resource Description Framework (RDF), DARPA Agent Markup Language (DAML), and others). In an exemplary embodiment the GSOS 100 employs an XML model to define this meta-data information.

An Extensible Meta-Data Processor

An extensible meta-data processor 300 (See also FIG. 4) includes a rule engine to process the meta-data associated with the state data 22 of a service 20. This rule engine is complex in nature by providing expert decision based on the meta-data. These decisions include when to notify a state change, interpret the semantics of the query and retrieve the state from an external resource (e.g., SQL, Simple Network Management Protocol (SNMP) server, Common Information Model Object Manager (CIMOM), web services) or from the service 20, make a decision on the transaction requirements and security constraints, to make decisions on the validity and availability of the state data 22 to make the decision about which query processor to use based on user and/or client query criteria. It will be appreciated that as described herein the extensible meta-data processor 300 is described as a part of or imbedded with the GSOS 100. However the meta-data processor 300 may also be pluggable with the GSOS providing the appropriate interfaces. It will be appreciated that the framework 10a provides an extension capability based on meta-data language extensibility to support custom scenarios.

Interface Framework to Define the Interaction Between a Service and GSOS

In an exemplary embodiment, the GSOS 100 provides a standard interface to define the interactions between the service 20 and GSOS 100. In an exemplary embodiment three types of interface are employed:

A. State meta-data management interface 102;
B. Gateway access interface 104; and
C. State data access interface 106 from the service or from external resources.

A Pluggable Architecture to Support Service State Data Query, Notification and Transformation In an exemplary embodiment, the GSOS 100 also provides interface to a number of pluggable processors to facilitate and support service state data Queries, Client notification and transformations. It will be appreciated that while in an exemplary embodiment three such pluggable processors are depicted and described, any number of pluggable processors and interfaces are conceivable without loss of generality. Moreover, it should be further appreciated that it is also conceivable to employ multiple processors of similar types. For example, multiple query interfaces 108 and processors 110 may be utilized to facilitate the needs of the framework 10a, and/or client 30, and the like.

Query

The query interface 108 enables the GSOS 100 to support any query language and processor 110 of of a client's 20 choice. The user/client 20 creates a query based on the schema associated with the state. GSOS 100 is responsible for applying the query on the state data 22 based on the meta-data information and it presents the Query results on service state data 22 to the query processor 110 in a canonical schema format understandable to the processor 110. In addition GSOS 100 also provides caching mechanisms to support faster query process. In an illustrative implementation of an exemplary embodiment of a GSOS 100 and the query interface 108 supports an in-memory XML Document Object Model (DOM) programming interface.

Notification

The GSOS 100 supports pluggable notification processors 114 with a notification processor interface 112 based on selected notification requirements. These requirements include service state aggregation, queuing, periodic delivery, and asynchronous behaviors. GSOS 100, based on the service state meta-data information automatically sends the state change information to this processor 114 with the current and old value of the state data 22.

Transformation

Based on a client's 20 request, the GSOS 100 framework transforms the results of a query or change notification to a format as prescribed by the client 20. The GSOS 100 incluses a transfrom processor interface 116 to facilitate plug-in of any transformation processor 118 of choice.

Service Oriented State Data and State Meta-Data Generation Using Meta Information Modeling Disclosed herein in another exemplary embodiment is a method and apparatus for generating service state data and extensible meta-data information based on the state data schema for a service-oriented architecture. This framework, uses a meta information model on the top of the state meta-data to provide more flexibility in modeling, versioning and compatibility. This enables the service component to be used with the framework utilizing the Gateway for Service Oriented State (GSOS) disclosed earlier, for various extensible data query support on service state data, automatic notifying capability on service state data change and data transform flexibility on service state data.

Figure 3:
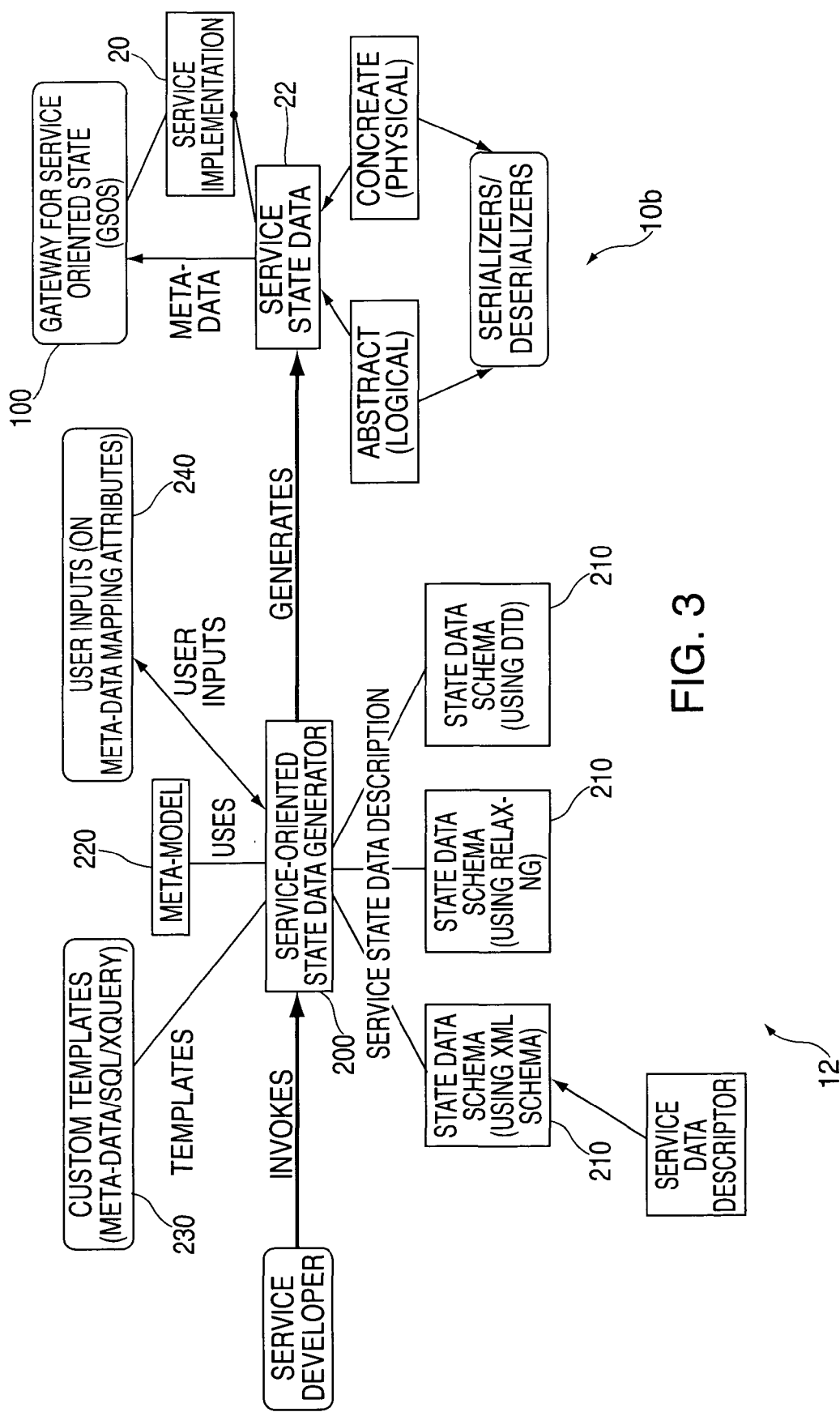
FIG. 3 illustrates a simplified block diagram of an information communication framework including a service oriented state generator in accordance with an exemplary embodiment.

Referring now to FIG. 3, a framework denoted here as 10b as an other exemplary embodiment and expansion of that described earlier, utilizing a service oriented state generator 200 hereinafter also denoted SSDG is depicted. In a service oriented component (e.g., java services and/or web services, enterprise, and the like), the state of a component is held by the service 20 through its instance variables and/or session state variables and/or persistence storage media and/or using external resources. The Gateway for Service Oriented State (GSOS) 100 and framework 10b, provides a flexible service state exposure model through various queries on the state of the service 20 using an exposed state information model (data schema). This framework 10b including the GSOS 100 is configured to be flexible and permits clients 20 to formulate query expressions on the service state data 22. This framework 10b also provides a means to define mechanisms to enable a service 20 to extend its state with change notification semantics. This extensible framework 10b depends on the state data and its meta-data information.

In an exemplary embodiment, a tool set shown generally as 12 (a service state generator framework) is defined to support creation of state data 22 with the necessary meta-data. Once again, this generated state data may be a logical or physical mapping to a service state data 22. This tool set 12 can operate on any data schema 210 (e.g., XML Schema, Document Type Definition (DTD), Regular Language Description For XML—Next Generaton (RELAX-NG) Schema). This service state generator 200 provides the maximum flexibility by using a meta-model 220 for modeling the state meta-data. The use of this modeling metaphor helps in defining a meta-data language with versioning, compatibility, a standard for tools to work on the state-data and a standard for code generation.

In an exemplary embodiment the tool set 12 and state data generator 200 provides numerous advantages and features for generation of service state data 22 utilizing various meta data and schema. For example, the tool set 12 and state data generator 200 generates state data, state data logical mapping and/or physical mapping, meta-data associated with the state data, and includes meta-data model 220 associated with the meta-data. The tool set 12 generates the necessary interfaces and code to support the state data and its usage in a service 20. In addition, this tool set 12 facilitates creation of the state data in the framework 10b as a logical grouping or as a direct physical representation with the necessary interfaces to support the meta-data requirements like serializes and deserializers, data push and pull mechanisms etc.

The tool set 12 and SSDG 200 works in conjunction with state data schema 210 and a meta-data language. The meta-data language is a common language for describing the meta-data through meta data models 220 (meta-data about meta-data) to facilitate and ensure compatibility with previous versions. This can be any existing XML languages or a derivative thereof. Moreover, the tool kit 12 facilitates extension to support new meta-data features. This toolset 12 works with state data schema 210; these state schema 210 may be associated with the WSDL (Web Service Description Language) through port type (interface) extensibility or by including external schema definitions. The state data schema 210 may be, but are not limited to, XML schema, RELAX-NG, Reverse Description Framework (RDF), and the like.

Figure 4:
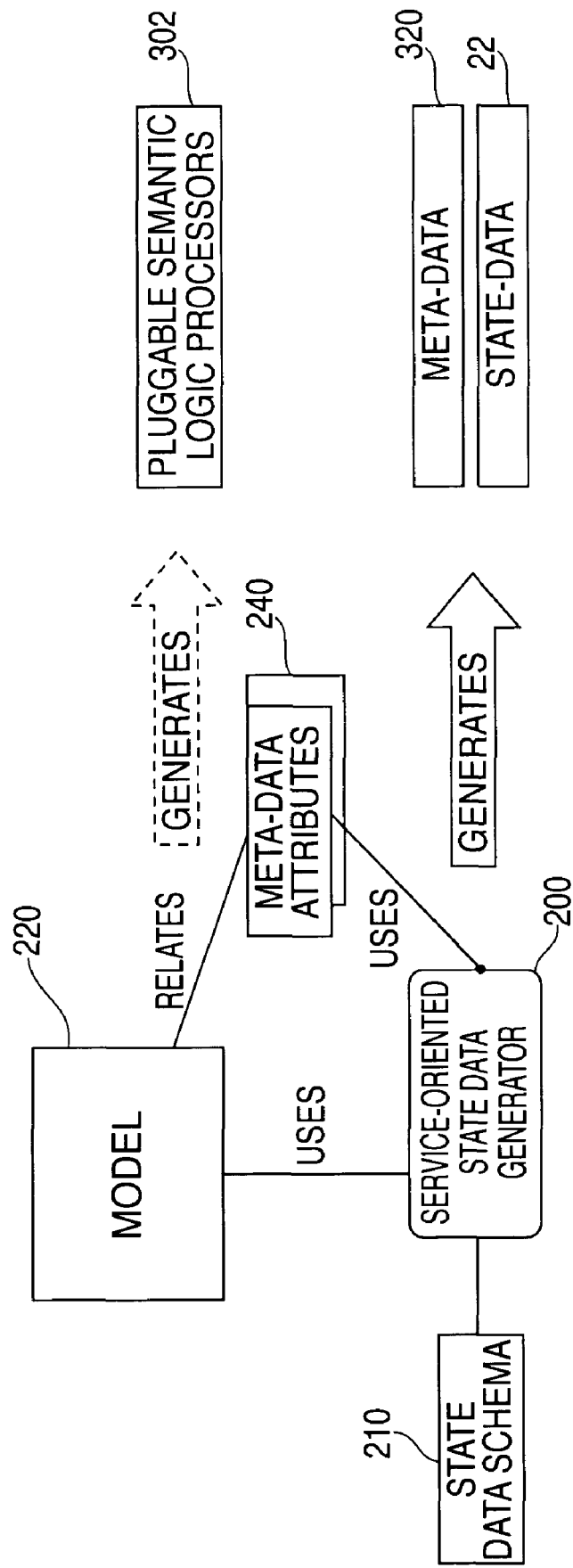
FIG. 4 depicts a relationship model in accordance with an exemplary embodiment.

Other inputs to the SSDG 200 may inlcude custom templates 230, meta-data attributes 240 and meta-information models etc.

a. Meta-data attributes 240 include, but are not limited to: Qualifiers: security, transaction, notifiability, and the like; constraints: state data mutability, Time To Live (TTL) features, cardinality, and relationship (workflow) information etc.; and Data access mechanisms: callback mechanisms, data push mechanisms, extensible data access mechanisms like connectivity to data base, Common Information Model Object TBD (CIMOM), Simple Network Management Protocol (SNMP) server and the like.

b. Meta information models 220 may be viewed as a schema or meta-data for the service state meta-data. Meta information modeling provides flexibility in the service state data 22 and meta-data design process by providing versioning, compatibility, flexible design process, and a standard code generation. The meta-data model based meta data, enables the tool set 12 to provide model versioning mechanisms. FIG. 4 depicts a relationship model in accordance with an exemplary embodiment illustrating the relationships among the elements of the tool set 12. Specifically, the relationships between the SSDG 200, meta-data model 220, and attributes 240 are illustrated.

c. Custom templates 230 include, but are not limited to, custom attributes (e.g., user defined attributes) and default values for the state meta-data.

The tool set 12 and SSDG 200 provides a Graphical User Interface (GUI) based and/or a command line solution to generate the state data 22 of a service 20 and to create the necessary meta-data and mapping information associated with that state data 22. Moreover, use GUI features like custom dialogs with user, drag and drop of meta-data information, flexible context menus and flexible ways to create state data relationships (workflows).

The tool set 12 and SSDG 200 includes a capability to obtain user (service developer) feedbacks on meta-data generation for a service state data 22; based on the attributes 240, e.g., qualifiers, constraints and data access mechanisms associated with the state data.

a. User can give feedbacks through custom dialog boxes. This tool set 12 can query developer feedback on the type of attributes 240 e.g., qualifiers for a state data; transaction requirements, access control information, notifiable capabilities etc.

b. User can pass parameters to this generator tool set 12;

c. User can provide templates to guide the meta-data generation and mapping.

The tool set 12 and SSDG 200 is developed and configured as a pluggable framework so that it can be used as an eclipse plug in or can be included with other user interfaces frameworks. User e.g., developer for the service 20, may define an extensible set of meta-data information and generate pluggable extension mechanisms for meta-data attributes 240, e.g., data qualifiers, constraints and access mechanisms based on the service 20 needs. Provides meta-data model 220 extensibility through pluggable frameworks. This enables a service developer to support custom meta-data attributes 240.

The tool set 12 provides a set of validation facilities to validate the meta-data based on meta-data model 220 and data schema 210. Moreover, the tool set 12 also provides some runtime validation on the access mechanisms. As an example, a user can validate data access using SQL queries and CIM against the utilities supplied.

The tool set 12 enables a state workflow model for developing a service state collaboration and state relationship.

State Meta-Data Processors Based on Meta Information Modeling in a Service Oriented Architecture Disclosed herein in yet another exemplary embodiment is a method and apparatus for embedded/pluggable state meta-data processors based on a meta information model in a service-oriented architecture. This framework provides one ore more processors generated from a meta model for Gateway for Service Oriented State (GSOS) framework as described above, with an extended set of capabilities by utilizing the extensible meta-information model framework also described herein, in order to process the meta-data related to state data qualifiers, constraints and access mechanisms. These processors are defined and can be executed in a service specific controller engine, which provides process flow and orchestration capabilities.

Figure 5:
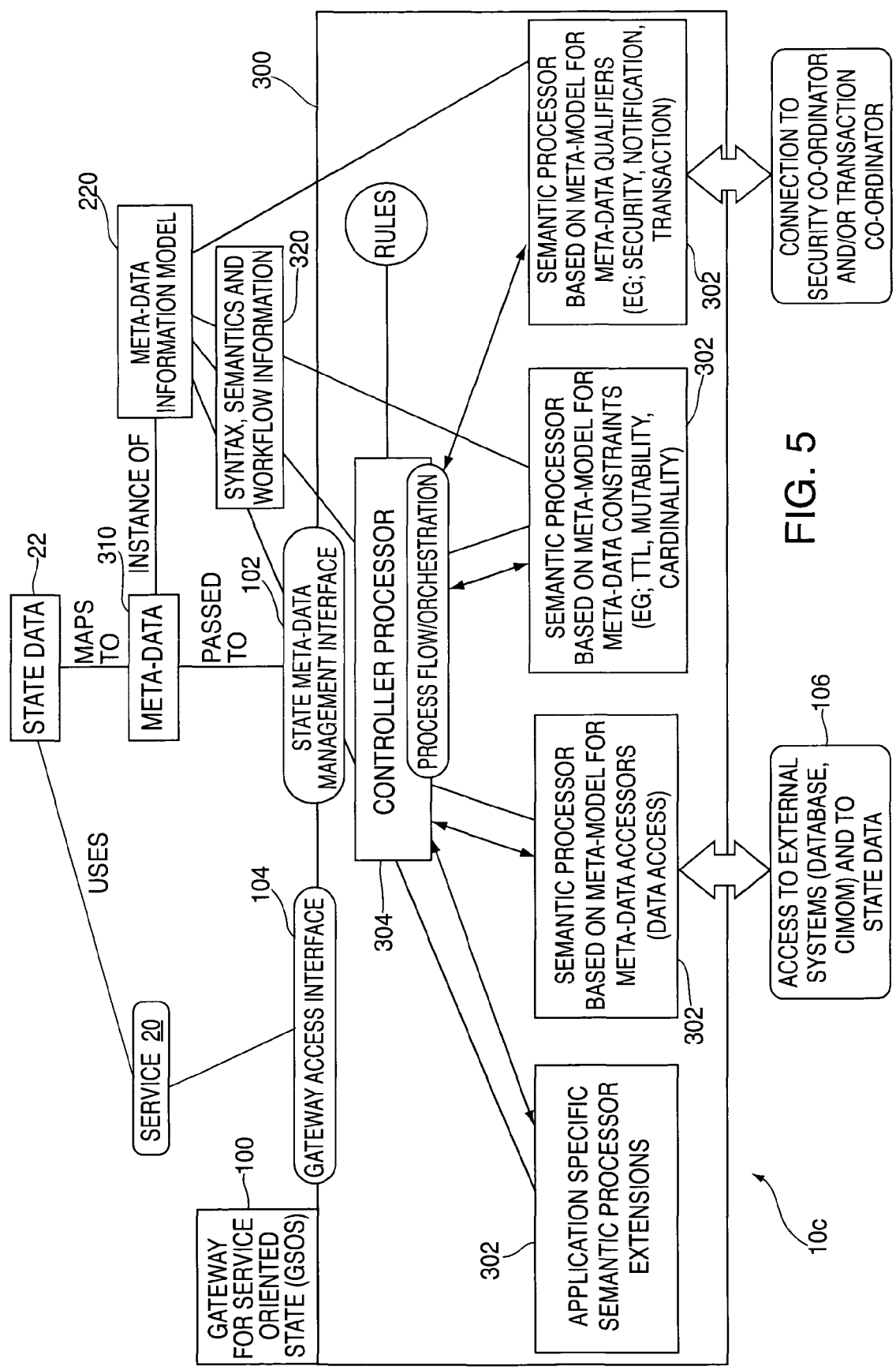
FIG. 5 illustrates a simplified block diagram of an an information communication framework including a pluggable extensible meta data processor in accordance with an exemplary embodiment.

Referring now to FIG. 5, in a service oriented architecture, the Gateway for Service Oriented State (GSOS) framework 10a (FIG. 2) and 10b (FIG. 3), provides a flexible service state exposure model through various queries on the state of the service using the exposed state information model (e.g., state data schema). This GSOS framework also facilitates defining mechanisms to enable a service 20 to extend its state with change notification semantics. Another feature of the above-mentioned frameworks 10a, 10b is the support of data transformation for the client 30 in a manner appropriate for their consumption. These extensible frameworks depend on the state data and its meta-data and a meta-data information model 220 (meta-data about meta-data). This meta-data provides state data qualifiers (security, transaction and notifiability etc), constraints (mutability, time to live) and access mechanisms (database connection, connection to CIMOM, SNMP etc). These meta-data are modeled using the meta information models 220 and this enables the application developer to create new meta models and/or extend the existing meta-models with new service defined semantics.

In yet another exemplary embodiment a framework 10c for processing meta-data and its associated semantics through embedded/pluggable and extensible meta-data processors 300 is described. Once again, it will be appreciated that the framework 10c for the meta-data processor 300 may be implemented in conjunction with the GSOS 100 and framework 10a, as well as the tool set 12 and SSDG and framwork 10b. The meta-data processsor as described herein in an exemplary embodiment may be considered embedded with the GSOS 100 or as pluggable thereto. Described herein in another exemplary embodiment is a framework 10c to use some workflow models (custom or pre-existing) to control the invocation flow and processing logics of the meta-data processors 300. In short, this permits definition of a meta information driven architecture, with platform independent models (PIM) for the state meta-data and with platform specific models (PSM) for semantic processors to process the meta-data associated with the state data.

Advantageously, the framework 10c of an exemplary embodiment includes a model driven architecture with platform independent models to define the meta-data for the state data and platform dependent models for specific (semantic) processing of this state meta-data based on the meta-data model 220. The separation of platform dependent and independent models enables an application developer to create flexible state data processing rules for any type of (EJBs, Java beans, NET services etc) service component.

Moreover, any number of generic semantic processors may be created and utilized to manage the state meta-data processing. Such a configuration permits a service developer to write specific extensions for semantics processing. One advantage facilitated by such generic semantics processing capability is that it permits flexiblility for model extensions and application processing extensions. Another capability of the semantic processors 302 is facilitates association of work flow mechanism (custom or preexisting orchestration engines)

As shown in the FIG. 2, as described above the Gateway for Service Oriented State (GSOS) is composed of a number of components. These components inlcude, but are not limited to, meta-data processors 300 (generated by meta-model tools and/or by the service developer and its extensions), interfaces to connect to the GSOS, an internal meta-data representation 102 and interfaces to connect to external systems and processors 108, 112, 116 (query, notification and transformation). In an exemplary embodiment as disclosed herein relates to meta-data processor(s) 300 and their relation to meta-data 310, meta-data information model 220, and a processor execution flow model. Moreover, a framework 10c for service specific controller processor (a service specific meta-data processor), which is responsible for managing the meta-data processing based on service specific requirements including introspection on meta-data 310 and meta-data processor 300 flow orchestration.

The major components of this process framework 10c and meta-data processor 300 includes, but are not limited to, a meta-data information model 220, meta-data information 310, semantic information processors 302, controller meta-data processors 304, as well as interfaces 102, 104, 106 for these processors 302, 304, and syntax, semantics and work flow information 320 for these processors 302, 304.

Meta-Data Information Model

Once again, meta-data information model 220 is employed to define meta-data about state meta-data. In an exemplary embodiment, this model 220 is platform independent (PI) and and platform extensible (PE) model with information including:

Meta-data syntax for state meta-data validation, versioning and consistency check;
Meta-data semantics for,
  a. Common semantic information on State data constraints, qualifiers and data access mechanisms
  b. Rules for processing the above meta-data semantics
  c. Meta-data processing (execution of semantic logics) workflow information;
Meta-data relationship; and
Meta-data extensibility to meet service needs.

This is a flexible information model and may be expressed in any model language (e.g., XML Metadata Interchange (XMI), Meta Object Facility (MOF), Unified Modeling Language (UML) and the like) and can be used by the Service Oriented State Data Generator SSDG 200 and tool set 12 to create a meta-data and generic semantic processors 302 to handle those meta-data 310.

As an example, we can define the semantic information on the transaction requirements on the state data through a meta-data model 220. The meta-data model 220 contains the platform independent model of the transaction attributes including transaction type, isolation level, locking etc. A service 20 developer can work with the tool set 12 as described previously herein with respect to the Service Oriented State Data Generator SSDG 200 (shown in FIG. 4) to generate platform specific models including a meta-data processor 300 for transaction management and transactional deployment and runtime configuration information for that specific platform.

Meta-Data Information

For each service state data 22 (logical or physical mapping), there is a meta-data mapping associated with the service state data 22 with details on its constraints, qualifiers and state data access mechanisms. These meta-data 310 are instances of the meta-information model 220 and forms the core data for the GSOS 100 to work with. This mapping information enables the design of a flexible state management framework. In an exemplary embodiment, tools are utilized to create these service state meta-data 310. These meta-data are associated with a meta-model for versioning, validation, consistency and process semantics.

Semantic Information Processors Based on Meta-Model to Process Meta Data

These semantic information processors 302 are created from the platform specific modeling artifacts, which are derived from the platform independent meta model. These processors 302 provide service 20 developers an interface to define rule engines to process the semantics associated with the meta-data 310. In other words, these processors 302 enforce the constraints on the state data specified by the meta-data 310. These processors may be built in platform specific and/or container specific processors to handle meta-data constraints, qualifiers and data access mechanisms. Once example of such a processor can be a transaction processor to process the transactional requirements on a state data access. These platform specific processors 302 may be configured to work in conjunction with a platform specific transaction coordinator to execute the transactional requirements on the state-data. These processors are configured to follow some specific contracts (interfaces and process flow) to conform to the meta-data model 220 as defined earlier. These are pluggable and extensible processors based on the model version and service specific requirements.

In an exemplary embodiment, the Semantic Information Meta-data processors 302 are configured to be platform dependent where each service extensible processor 302 relates to selected meta-model semantics with a rule engine to execute the meta-data semantics. Each semantic processor 302 follows a well defined contract model dictated by th control processor 304 for interoperability between semantic processors 302. Advantageously, the semantic meta-data processsor 302 may employ a standard programming model to access and discover meta-data. In addition these processors may be employed to validate the meta-data using a meta-data model 220.

Controller Meta-Data Processors

The controller processors 304 are service specific meta-data processors (acting as controller) 304, that define the contracts between the semantic processors 302 and control the flow of data between the semantic processors 302 based on the state meta data information. The service 20 developer, based on the rules defined in the meta-data and meta-data model 220 can develop these processors 304 and contracts. A tool set may be used to develop the basic skeleton of this processor 302. This processor provides a state meta-data and state data repository. This repository can be physical representation (caching) for improved performance or can be a logical representation with external storage in the service 20 or elsewhere (databases). In an exemplary embodiment, the functionalities provided by this processor 304 include, but are not limited to, validation of the meta-data with meta-data model 220, introspection on the meta-data to identify and select an appropriate processor execution engine, control of the semantic processor(s) 302 execution flow using an appropriate orchestration engine, providing contract definition among various semantic meta-data processors 302, and providing flow mechanisms between semantic meta-data processors 302. The control processor may also provide a meta-data or state data repository.

Interfaces and Process Flow

All the meta-data processors 302, 304 should follow some defined contract information and of course, would need to follow well-defined interface requirements. In an exemplary embodiment a state less model of meta-data processors is defined. These contracts are used for managing interfaces such as, life cycle management, state management, and processing contracts (data flow, validation, versioning etc). The contracts also faciltate management of process flow by coordinate work flow with a workflow engine, and implementing workflow requirements.

To reiterate, these meta-data processors 300 provides a pluggable and extensible framework 10c for managing the state data through its meta-data semantics. This state data can be local to the service or can be stored elsewhere or can be held in any external resource. These meta-data processors 300 provides a common view of the data to the client by providing abstract models (meta models) whereby hiding the internal platform specific details.

The disclosed invention can be embodied in the form of computer, controller, or processor implemented processes and apparatuses for practicing those processes. The present invention can also be embodied in the form of computer program code containing instructions embodied in tangible media 2 (FIG. 1A), such as floppy diskettes, CD-ROMs, hard drives, or any other computer-readable storage medium, wherein, when the computer program code is loaded into and executed by a computer, controller, or processor 1, the computer, controller, or processor 1 becomes an apparatus for practicing the invention. The present invention may also be embodied in the form of computer program code as a data signal 3, for example, whether stored in a storage medium, loaded into and/or executed by a computer, controller, or processor 1, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor, 1 the computer program code segments configure the processor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for managing state data of a service in a service-oriented architecture by establishing a gateway for service-oriented state comprising:

configuring an extensible, pluggable interface to support for extensible processor interfaces; data query support on service state data, automated notification capability on service state to a client; and automated data transform on service state data to a client format; defining an interface framework for interaction between a service and said gateway;

establishing an extensible meta-data definition comprising an extensible set of service state data attributes including state data qualifiers, constraints, and access mechanisms; and utilizing one or more pluggable processors configured to utilize said extensible meta-data definition for interfaces and decision making based on said meta-data;

wherein said extensible data query support on service state data includes:

enabling a service developer to define a query type based on a state data schema definition;

enabling a service user to send a state data query and query type to said service and transmitting said state data query and query type to a service state query processor; wherein said service state query processor evaluates said query and informs said gateway with state data information to facilitate processing said query and said gateway retrieves said state data information using meta-data information of said service state data;

wherein said state data information is converted to a canonical data format to facilitate comprehension by said service query processor;

wherein said query processor conducts said query on said service state data; and wherein query results are sent back to said client in a format as requested using a transformation processor.

2. The method of claim 1 wherein said establishing meta-data definition for state data attributes including service state data qualifiers includes:

enabling expression of state change notification qualifiers, said qualifiers including notification of a change in state results;

enabling definition and expression of security requirements on a service state discovery and notification;

enabling expression of transaction requirements, said transaction requirements including enable/disable transaction; and providing a framework to link to a transaction coordinator and define transaction scope said transaction scope including a service developer controlled transaction, a service controlled transaction, and a gateway managed transaction on state data.

3. The method of claim 1 wherein said establishing meta-data definition for state data attributes including service state data constraint comprises;

enabling expression of constraints on mutability;

enabling expression of constraints on a validity of said service state data through life time constraints, said life time constraints including at least one of, time to live (TTL), time to activate, available from, available until, good from, good until and immutable until;

enabling cardinality on said service state data; and enabling and specification of a relationship among said service state data, said specification supporting complex queries and state management.

4. The method of claim 1 wherein said establishing meta-data definition for state data attributes including service state data access mechanisms comprising:

enabling a flexible callback mechanism on said service state data and expression thereof through meta-data;

establishing a data push mechanism for service state data update with expression of said constraints through meta-data;

establishing other extensible data access mechanisms on said service state data, said other extensible data access mechanisms including direct access to said service state data in a database; direct access to said state data through SNMP, CIM, Web services; and establishing an extensible custom template mechanism for service state data access based on service requirements; said service state data access based on service requirements including a service template for custom scripts such as SQL.

5. The method of claim 1 wherein said automated notification capability on service state to a client includes:

enabling said gateway to define a pluggable framework for a notification processor based on notification semantics, said notification semantics including selected query criteria established by said client;

enabling said gateway to send notification to a client based on a state change, wherein said state change is a result of at least one of a state data push model, a state data pull model, and another state change indication; and said notification processor is configured to utilize a transformation processor to facilitate providing state data to a client in a selected format.

6. The method of claim 1 wherein said automated data transform on service state data to a client format comprises:

defining a transformation processor configured to transform results of a query or notification on state data based on a client requirement;

enabling a client to specify a format for results, said gateway formatting said results using an appropriate transformation processor; and wherein a query processor and a notification processor are configured to employ said transformation processor.

7. The method of claim 1 wherein said extensible meta-data definition for interfaces facilitates providing said client with meta-data and semantic information comprising:

obtaining a current set of state meta-data on said service;

revising meta-data about said service state data;

establishing consistent meta-modeling techniques; and providing meta-model versioning capabilities and version compatibility to support any meta-data.

8. The method of claim 1 further including providing a framework for meta-data, and a meta-model repository to support caching capability on said service state data execution.

9. The method of claim 8 wherein said framework includes at least one of an in-memory XML DOM representation for XQuery and a Java object caching mechanism.

10. The method of claim 1 further including defining a meta-data language, said language comprising an annotation to existing service state data schema and a reference to said service state data and its schema.

11. The method of claim 1 further including defining a flexible meta-model definition for meta-data.

12. The method of claim 1 wherein said flexible meta-model definition supports different versions of meta-data and enables consistency across meta-data modeling.

13. The method of claim 1 further including supporting a meta-data schema processor with extensibility to support new meta-data extensions including a semantic information model on said service state data.

14. The method of claim 1 further including providing persistence storage for said service state data and its meta-data, said storage facilitating recoverability and scalability on said service state data and associated meta-data.

15. The method of claim 1 wherein said interface framework includes at least one of an interface for managing meta-data associated with said service state data, an interface to facilitate access to gateway functionalities including query execution, semantics and to access a gateway information model, and a plug-in architecture to manage meta-data, query, notification and transform processors.

* * * * *